United States Patent
Fujikawa et al.

(10) Patent No.: US 7,423,581 B2
(45) Date of Patent: Sep. 9, 2008

(54) RADAR AND SIMILAR APPARATUS

(75) Inventors: Takumi Fujikawa, Nishinomiya (JP);
Takehiro Yamashita, Nishinomiya (JP);
Sae Shibata, Nishinomiya (JP); Yasushi Maruono, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 248 days.

(21) Appl. No.: 11/249,417

(22) Filed: Oct. 14, 2005

(65) Prior Publication Data

US 2006/0082493 A1   Apr. 20, 2006

(30) Foreign Application Priority Data

Oct. 15, 2004   (JP) ............................ 2004-302052

(51) Int. Cl.
*G01S 7/292* (2006.01)
(52) U.S. Cl. ...................... 342/159; 342/179; 342/189; 342/195
(58) Field of Classification Search .................. 342/189
See application file for complete search history.

(56) References Cited

U.S. PATENT DOCUMENTS

| 4,636,793 | A |   | 1/1987 | D'Addio et al. |
| 4,833,475 | A | * | 5/1989 | Pease et al. ................. 342/185 |
| 4,845,501 | A | * | 7/1989 | Pease et al. ................. 342/185 |
| 4,940,988 | A |   | 7/1990 | Taylor, Jr. |
| 5,097,268 | A | * | 3/1992 | Bauer et al. ................. 342/160 |
| 5,229,775 | A | * | 7/1993 | Sakamoto et al. ........... 342/160 |
| 5,867,121 | A | * | 2/1999 | Erickson et al. ............. 342/185 |

(Continued)

FOREIGN PATENT DOCUMENTS

| DE | 197 34 614 A1 | 2/1999 |
| GB | 2 276 056 A | 9/1994 |
| JP | 11-352212 A | 12/1999 |

OTHER PUBLICATIONS

Barbaresco F et al., "Motion-based segmentation and tracking of dynamic radar clutters", Proceeding of the International Conference on Image Processing (ICIP) Lausanne, Sep. 16-19, 1996, New York, IEEE, US, vol. 1, pp. 923-926, XP010202546 ISBN: 0-7803-3259-8.

*Primary Examiner*—Thomas H. Tarcza
*Assistant Examiner*—Matthew M Barker
(74) *Attorney, Agent, or Firm*—Birch, Stewart, Kolasch & Birch, LLP

(57) ABSTRACT

A radar device is provided that can reliably display sensed image data of an object, regardless of the state of the object (echo) within a sensed range and of the surrounding environment. A behavior data detector 11 generates current level detection data by detecting a level behavior of sensed image data X(n) handled by a W data generator 7 from sensed data x(n) that is output from a sweep memory 4. Previous behavior data constituted by level detection data of several past scans is stored in a behavior data memory 12, and the behavior detector 11 updates the previous behavior data with the current level detection data and outputs the result to the W data generator 7. Detecting characteristics of the sensed image data of corresponding pixels from the behavior data, the W data generator 7 selects filter calculation data W(n), the current sensed image data X(n) or specific filter calculation data Z(n) and outputs the selected result as written image data Y(n).

3 Claims, 9 Drawing Sheets

U.S. PATENT DOCUMENTS 6,043,775 A * 3/2000 Erickson et al. ............. 342/185
6,198,429 B1 3/2001 Fujikawa et al.
6,441,775 B1 8/2002 Fujikawa et al.

* cited by examiner

Fig. 3

Fig. 3 (A)  Classification Code 1

| 0 | 0 | 0 | 0 | 0 | 0 | 0 | 1 |

Fig. 3 (B)  Classification Code 2

| 0 | 0 | 0 | 0 | 0 | 0 | 1 | 1 |

Fig. 3 (C)  Classification Code 3

| 0 | 0 | 0 | 0 | 0 | 1 | 1 | 1 |

Fig. 3 (D)  Classification Code 4

| 0 | 0 | 0 | 0 | 0 | 0 | 1 | 0 |

| — | — | 0 | 0 | 0 | 0 | 0 | 0 |

(— : don't care)

Fig. 3 (E)  Classification Code 0
Other Patterns than Above

Fig. 4

| bit 7 | bit 6 | bit 5 | bit 4 | bit 3 | bit 2 | bit 1 | bit 0 |
|---|---|---|---|---|---|---|---|

Fig. 4 (A)  before ship appears

| 0 | 0 | 0 | 0 | 0 | 0 | 0 | 0 | B (0)

Fig. 4 (B)  ship starts to appear

| 0 | 0 | 0 | 0 | 0 | 0 | 0 | 1 | B (1)

Fig. 4 (C)  2 scans have passed (while ship is passing)

| 0 | 0 | 0 | 0 | 0 | 0 | 1 | 1 | B (2)

Fig. 4 (D)  3 scans have passed (while ship is passing)

| 0 | 0 | 0 | 0 | 0 | 1 | 1 | 1 | B (3)

Fig. 4 (E)  ship has completely passed

| 0 | 0 | 0 | 0 | 1 | 1 | 1 | 0 | B (4)

Fig. 4 (F)  2 scans have passed (after ship has passed)

| 0 | 0 | 0 | 1 | 1 | 1 | 0 | 0 | B (5)

Fig. 4 (G)  3 scans have passed (after ship has passed)

| 0 | 0 | 1 | 1 | 1 | 0 | 0 | 0 | B (6)

Fig. 4 (H)  4 scans have passed (after ship has passed)

| 0 | 1 | 1 | 1 | 0 | 0 | 0 | 0 | B (7)

Fig. 4 (I)  5 scans have passed (after ship has passed)

| 1 | 1 | 1 | 0 | 0 | 0 | 0 | 0 | B (8)

Fig. 4 (J)  6 scans have passed (after ship has passed)

| 1 | 1 | 0 | 0 | 0 | 0 | 0 | 0 | B (9)

Fig. 4 (K)  presence during only one scan after no presence

| 0 | 0 | 0 | 0 | 0 | 0 | 1 | 0 |

Fig. 4 (L)  ship whose speed is very slow or fixed object

| 1 | 1 | 1 | 1 | 1 | 1 | 1 | 1 |

Fig. 4 (M)  ship whose speed is very slow or fixed object vanishes

| 1 | 1 | 1 | 1 | 1 | 1 | 1 | 0 |

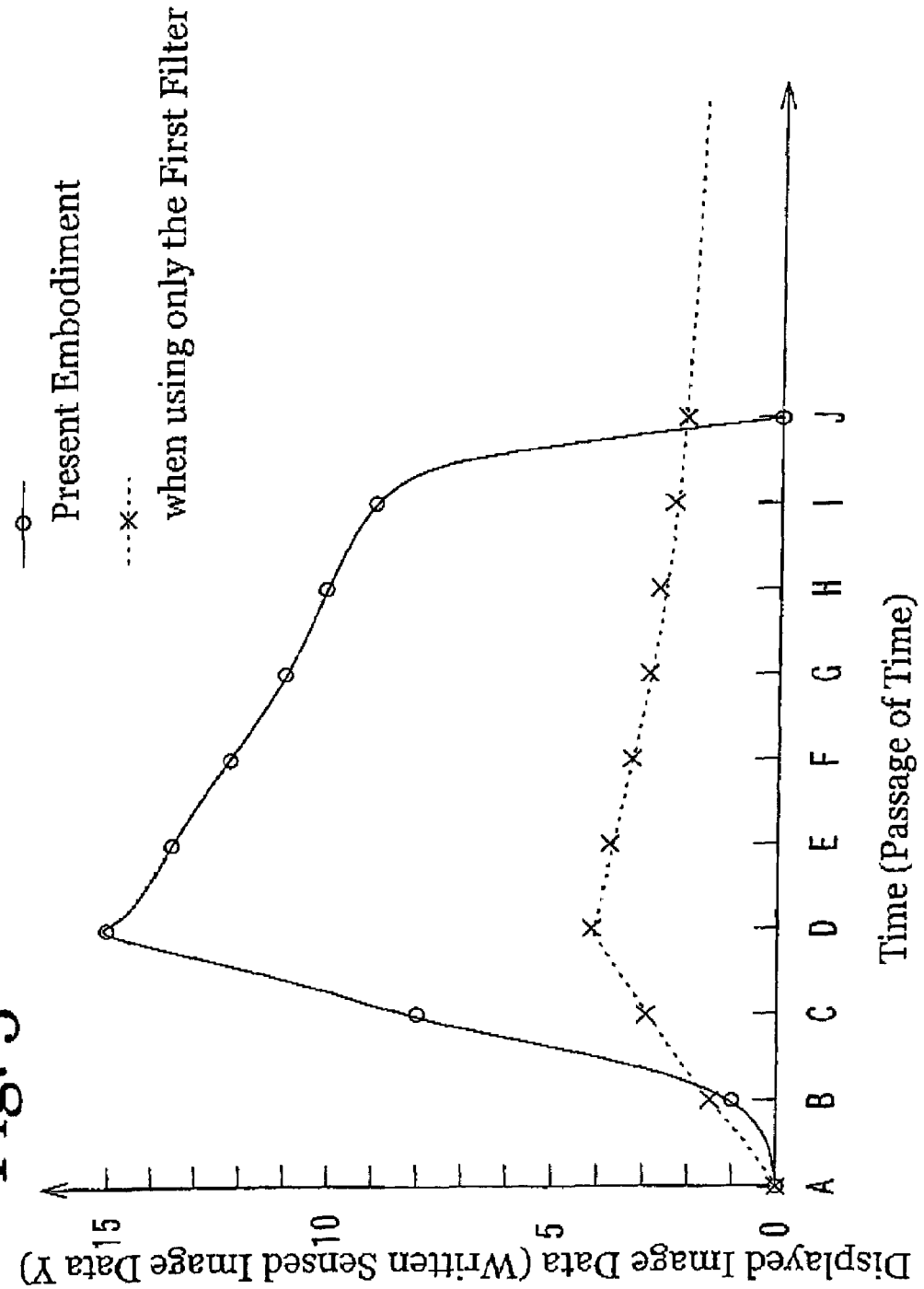

Fig. 6
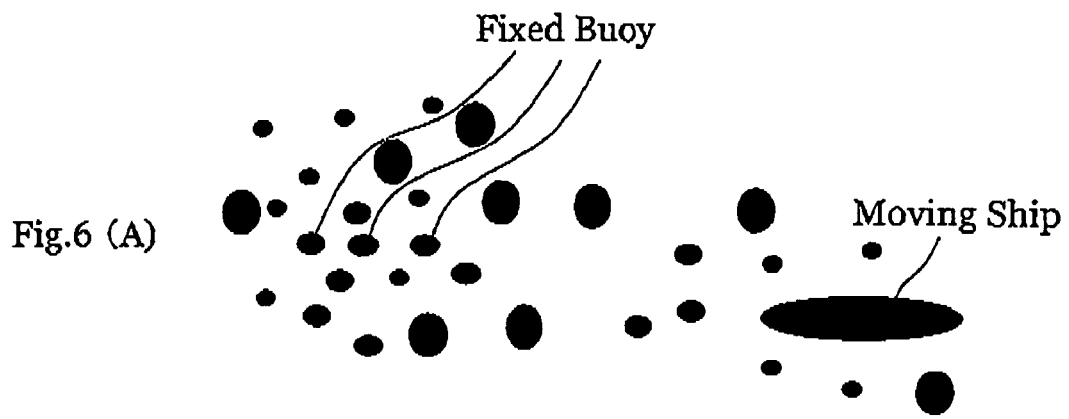
Fig.6 (A)
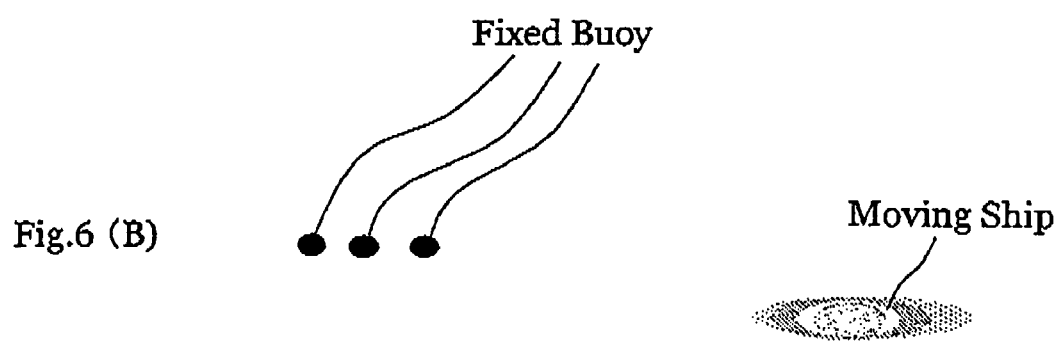
Fig.6 (B)
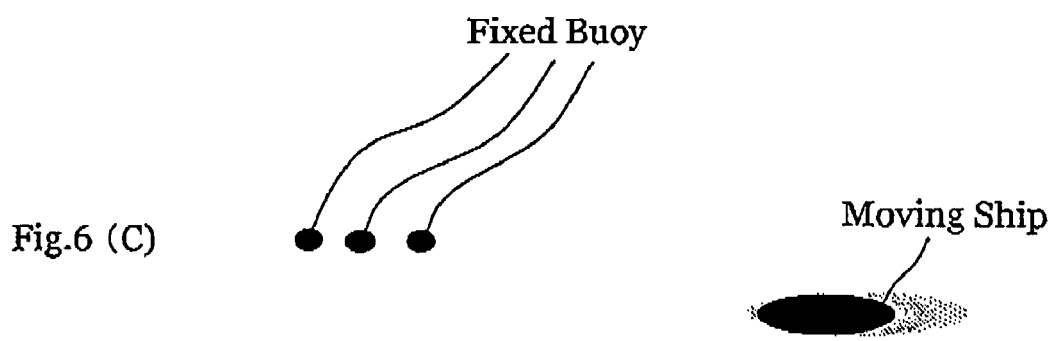
Fig.6 (C)

Fig. 7
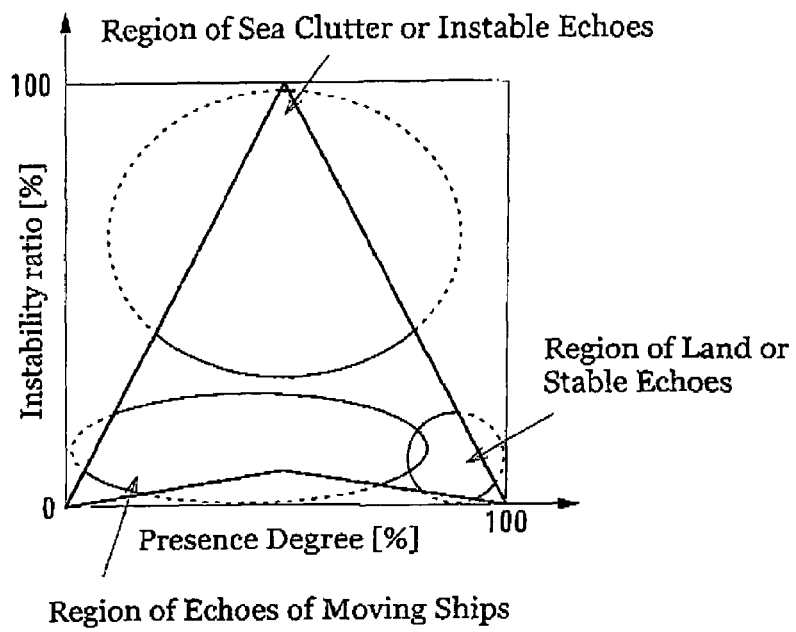
Fig. 7 (A)
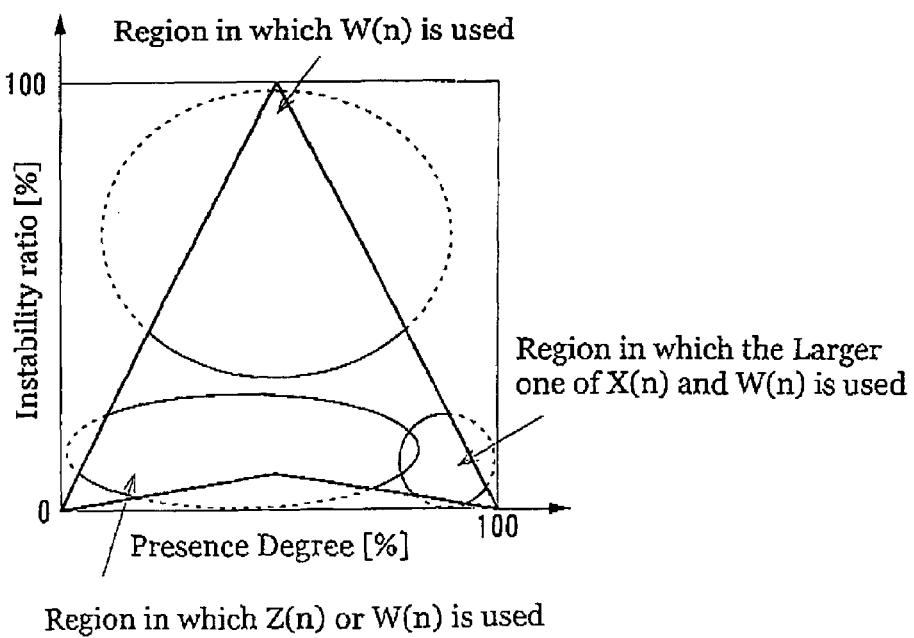
Fig. 7 (B)

RADAR AND SIMILAR APPARATUS

FIELD OF THE INVENTION

The present invention relates to a radar or similar apparatus that performs a scan correlation process with current sensed image data and past sensed image data that has been stored.

BACKGROUND ART

Conventionally, scan correlation processing is used to eliminate sea level reflections (so-called "sea clutter") in marine radar devices. In scan correlation processing, current sensed image data and written sensed image data of the same position that has been written one antenna rotation (one scan) before is used to determine the current written sensed image data. As a radar device performing such a scan correlation process, for example JP H11-352212A discloses a radar device performing scan correlation processing that is provided with an image memory storing sensed image data for one scan, and a write data generator that subjects the written sensed image data stored in the image memory and the current acquired sensed image data to predetermined data processing to generate new sensed image data.

FIG. 8 is a block diagram outlining the configuration of a conventional radar device. FIG. 9 is a block diagram illustrating the function of the write data generator of the radar device shown in FIG. 8.

As shown in FIG. 8, this conventional radar device includes a radar antenna 101 that, while rotating through the horizontal plane at a predetermined rotation period, sends out a pulse-shaped electromagnetic wave (send pulse signal) during a send period, and receives, in a polar coordinate system, electromagnetic waves (sense signals) reflected by an object during a receive period; a receiver portion 102 detecting a sensed signal; an A/D 103 sampling the sensed signal at a predetermined period and converting it into digital sensed data; and a sweep memory 104 into which the sensed data of one sweep are written in real time, and that outputs the data of this one sweep to a W data generator (write data generator) 107 before the sensed data obtained by the next send process are written again.

Moreover, this conventional radar device further includes a write address generator 105 and a FIRST/LAST detector 106. The write address generator 105 produces addresses specifying pixels in the image memory 108, arranged in a rectangular coordinate system, from the antenna angle θ (taking a predetermined direction as a reference) and the read-out position r of the sweep memory 104, taking the sweep rotation center as the start address and going around from the center. The FIRST/LAST detector 106 detects the timing at which, in one sweep rotation, a sweep has first accessed or last accessed each pixel in the rectangular coordinate system specified by the write address generator 105 in the image memory 108, and gives out a FIRST signal or a LAST signal.

The conventional radar device further comprises a W data (write data) generator 107, an image memory 108 and a display 109. The W data (write data) generator 107 performs a scan correlation between the sensed image data X(n) from the sweep memory 104 and the previous written sensed image data Y(n−1) at the timing of the FIRST signal or the LAST signal, and creates current written sensed image data Y(n). The written sensed image data are then written into the image memory 108 at the pixel addresses specified by the write address generator 105, and the written image data is displayed on the display 109.

The W data generator 107 of the conventional radar device has the function illustrated in FIG. 9, and determines the image data Y(n) to be currently stored in the image memory 108, in accordance with preset rules using the image data Y(n−1) stored pixel by pixel in the image memory 108 one antenna rotation before and the current image data X(n) that is input from the sweep memory. As an example of this rule, the image data Y(n) can be determined with the following rule:

$$Y(n) = \alpha \cdot X(n) + \beta \cdot Y(n-1) \tag{1}$$

Here, $\alpha$ and $\beta$ are coefficients that are set in advance, in accordance with the purpose of the scan correlation process and the application.

In conventional radar devices performing a scan correlation process, the sensed image data that is currently to be written into the image memory (written sensed image data) is determined by the currently obtained sensed image data, the previously written sensed image data that is stored in the image memory, which is obtained from the sensed image data up to the previous scan, and coefficients for matching to a previously determined application. Therefore, obtaining a valid scan correlation process, that is, obtaining the most suitable effect for the scan correlation process is limited to the case that the previously set rules match the behavior of the sensed image data. For this reason, several types of scan correlation processing modes can be set, and the operator can switch to the most suitable processing mode for what is to be observed.

However, the conventional scan correlation process performs the same process on the entire processing range, so that if there are objects within that range that have different kinds of behavior, then it is not possible to concurrently perform an optimal scan correlation process for all those objects. That is to say, even if the scan correlation process is valid for a given portion within that range, it may conversely give poor results for other portions.

For example, if a buoy is recognized within sea clutter and another ship moving at a high speed is present as well, then the sea clutter can be suppressed, but that will also suppress quickly moving ships, so that the ship will become difficult to recognize. If, on the other hand, a scan correlation processing mode is selected with which other ships moving at high speed can be easily recognized, then the effect of removing sea clutter is diminished accordingly, so that the buoy becomes difficult to recognize.

Furthermore, if the state of the received echo or the state of the surroundings change as time passes or as the observation position (position of the own ship) moves, the operator needed to switch the optimal scan correlation processing mode in accordance with those changes.

Consequently, it is an object of the present invention to provide a radar and similar apparatus, that can reliably display sensed image data of objects, regardless of the state of the object within a sensed range and of the surrounding environment.

SUMMARY OF THE INVENTION

According to one aspect of the present invention, a radar or similar apparatus includes:

a sensed image data generation means for extracting sensed image data corresponding to pixels of an image memory from received sensed data, and generating current written sensed image data to be written into the image memory, based on the extracted sensed image data and previously written sensed image data stored in the image memory;

an image memory storing written sensed image data for one scan;

a display device showing display image data based on the current written sensed image data; and a behavior data generation means comprising:

a behavior data detection means for detecting a level change behavior for each scan of the extracted sensed image data; and a behavior data storage means for storing behavior data for each pixel for a predetermined number of scans;

the behavior data generation means outputting the behavior data, while updating the behavior data, to the sensed image data generation means;

wherein the sensed image data generation means recognizes characteristics of the sensed image data of the corresponding pixels from behavior data of a time series input from the behavior data generation means, and generates the written sensed image data that is written into each pixel through a filtering process and a selection process in accordance with the result of this recognition.

With this configuration, the sensed image data generation means reads out the previous written image data (previous display image data) that is generated based on the previous scans and stored in the image memory, for the pixels corresponding to the current sensed image data. The behavior data detection means detects the behavior of levels of the sensed image data of those pixels from the received sensed data and generates current behavior data. The behavior data of a predetermined number of past scans is stored in the behavior data storage means, and the behavior data generation means outputs the behavior data of a predetermined number of scans that has been updated by the current behavior data to the sensed image data generation means. Based on the behavior data of an entered time series, the sensed image data generation means recognizes characteristics of the sensed image data of those pixels (for example, that they are sea clutter, fixed objects, moving objects, or the like). Moreover, in accordance with the result of this recognition, the sensed image data generation means performs a filter process in accordance with the current sensed image data and the previous written sensed image data that is read out from the image memory, and generates the current written sensed image data. That is to say, it performs a scan correlation process. This sensed image data is stored in the image memory, and is not only used for the next filter process, but also output as the current display image data to a display or the like.

In the radar device according to a preferred embodiment of the present invention, the sensed image data generation means may detect, from the behavior data, a presence ratio of the sensed image data and an instability ratio given by the number of times that the sensed image data changes within a predetermined period, and perform the filtering process and the selection process based on the presence ratio and the instability ratio.

In the radar device according to another preferred embodiment, the sensed image data generation means may vary a coefficient of the filtering process based on the presence ratio and the instability ratio.

In the radar device according to another preferred embodiment, if the behavior data turns into any one of a predetermined number of specific patterns that have been set in advance, the sensed image data generation means performs a specific filtering process in accordance with the specific pattern.

With these configurations, based on the fact that the change of the sensed image data depends on whether it corresponds to a fixed object, a moving object or sea clutter, the characteristics of the sensed image data are detected by detecting the change of the behavior data corresponding to the sensed image data. One parameter for this is the presence ratio, which indicates for how long sensed image data is present in a corresponding pixel, and is expressed by the proportion of the presence of the data in the behavior data of a number of previous scans including the current one. Another parameter is the instability ratio, which indicates how instable the sensed image data for a corresponding pixel is, and is expressed by the proportion of changes in the behavior data of a number of previous scans including the current one. For example, the presence ratio of a fixed object is high and its instability ratio is low; the instability ratio of sea clutter is high; and the instability ratio of a moving ship is low. Furthermore, the behavior of a moving ship shows a specific pattern.

Based on the characteristics of the sensed image data obtained in this manner, the sensed image data generation means performs a filtering process and a selection process on the data of each pixel. During this, the coefficients of the filtering process are changed in accordance with those characteristics. For example, in accordance with the characteristics of the sensed image data, the current sensed image data may be directly taken as the written sensed image data, the result of a filtering process of the current sensed image data and the previous written sensed image data may be taken as the written sensed image data, or the coefficients of this filtering process may be changed.

In accordance with the present invention, by changing the details of the scan correlation process in accordance with the behavior of a scans of sensed image data of corresponding pixels, it is possible to obtain an optimal scan correlation processing result. Thus, it is possible to configure a radar or similar apparatus that reliably displays the desired object, regardless of the external situation. Furthermore, the radar device automatically adapts itself to the optimal scan correlation processing conditions in accordance with the state of the radar device, so that the desired object can be reliably displayed without the operator performing any bothersome operations.

BRIEF DESCRIPTION OF THE DRAWINGS

FIG. 3 is a diagram showing classification patterns of the behavior data.

FIG. 4 is a diagram outlining the change of the content of each bit of the behavior data memory in predetermined states.

FIG. 5 is a diagram illustrating the temporal change of the display image data.

FIG. 6 is a diagram illustrating various display images.

FIG. 7 is a diagram showing the relation between the presence ratio $E(n)$, the instability ratio $U(n)$ and the various echo regions, as well as the relation between the presence ratio $E(n)$, the instability ratio $U(n)$, the filter calculation data $W(n)$, the sensed image data $X(n)$ and the selection regions of the specific filter calculation data $Z(n)$.

DESCRIPTION OF THE PREFERRED EMBODIMENTS

Referring to the accompanying drawings, the following is a description of a radar device according to an embodiment of the present invention.

Figure 1:
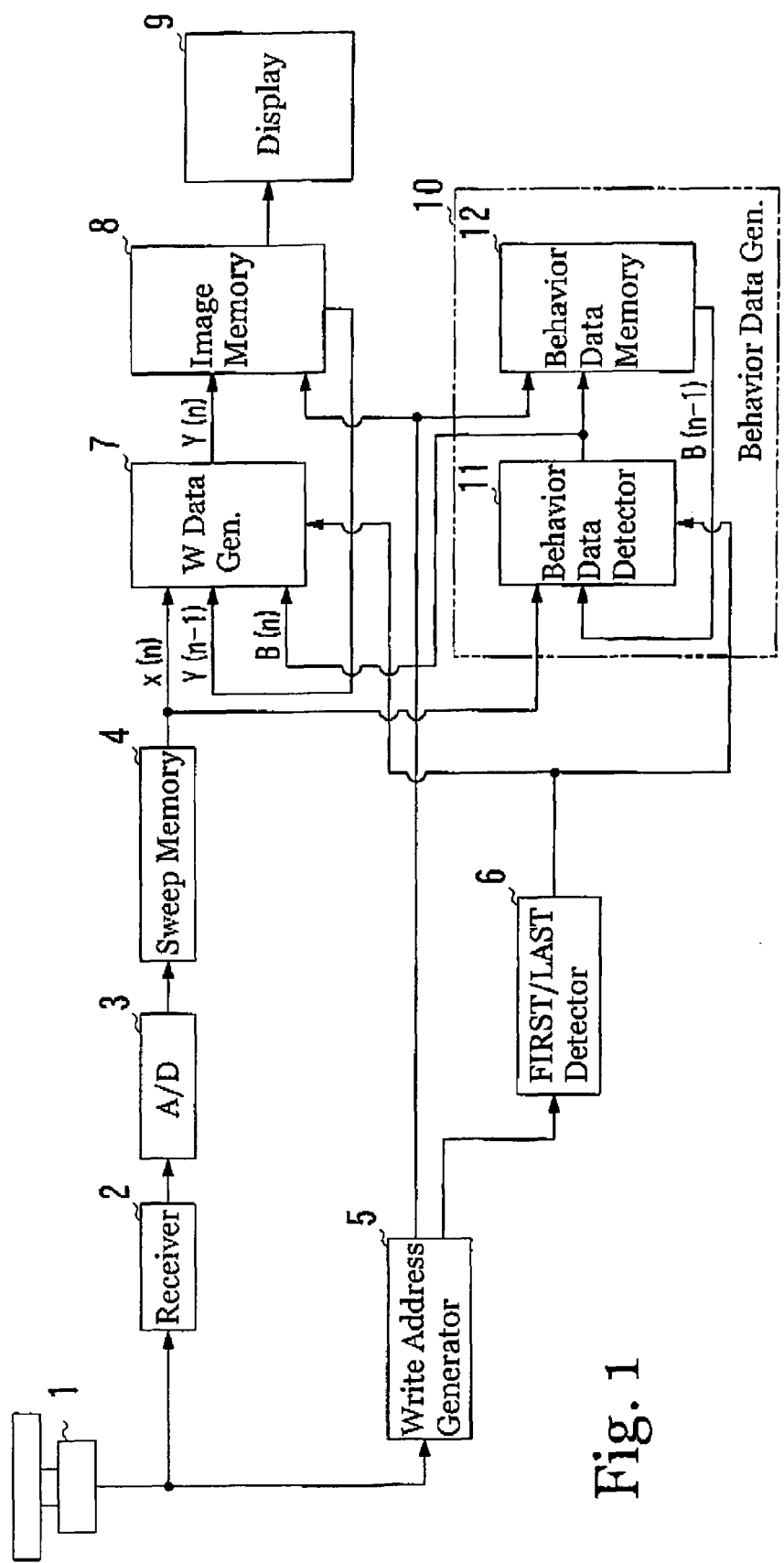
FIG. 1 is a block diagram outlining the configuration of a radar device according to an embodiment of the present invention.

FIG. 1 is a block diagram showing an overview of the configuration of a radar device according to this embodiment.

As shown in FIG. 1, the radar device of this embodiment includes a radar antenna 1, a radar receiver 2, an A/D 3, a sweep memory 4, a write address generator 5, a FIRST/LAST detector 6, a W data generator 7, an image memory 8, a display 9, and a behavior data generator 10.

The radar antenna 1 sends out a pulse-shaped electromagnetic wave (send pulse signal) during a send period, while rotating at a predetermined rotation period in the horizontal plane. Furthermore, the radar antenna 1 receives, in a polar coordinate system, electromagnetic waves (sense signals) reflected by a object during a receive period, outputs the sense signals to the receiver portion 2, and outputs sweep angle data (the antenna angle θ) to the write address generator 5.

The receiver portion 2 amplifies and detects the sensed signal from the radar antenna 1, and performs a STC process or the like, the result of which is output to the A/D 3.

The A/D 3 samples the analog sensed signal and converts it into digital sensed data.

The sweep memory 4, into which the digitalized sensed data of one sweep is written in real time, outputs the data x(n) of this one sweep to the W data generator 7 and to a behavior data detector 11 of the behavior data generator 10, before the sensed data obtained by the next send process are written again.

The write address generator 5 produces addresses specifying pixels in the image memory 8, arranged in a corresponding rectangular coordinate system, and corresponding pixels in a behavior data memory 12 of the behavior data generator 10 from the antenna angle θ (taking a predetermined direction as a reference) and the read-out position r of the sweep memory 4, taking the sweep rotation center as the start address and going around from the center. The write address generator 5 then outputs the produced addresses to the image memory 8 and the behavior data memory 12.

Note that the write address generator 5 is configured by hardware realizing the following equations:

$$X = Xs + r \sin \theta$$

$$Y = Ys + r \cos \theta$$

where X, Y: address specifying a pixel in the image memory 8 (or behavior data memory 12)

Xs, Ys: center address of sweep r: distance from center

θ: angle of sweep (antenna)

The FIRST/LAST detector 6 detects the timing at which, in one sweep rotation, a sweep has first accessed or last accessed each pixel in the rectangular coordinate system set in the write address generator 5 in the image memory 8 and the behavior data memory 12, and feeds that timing as a FIRST signal or a LAST signal to the W data generator 7 and the behavior data detector 11 of the behavior data generator 10. Here, the timing at which a sweep first accesses a pixel means the timing at which a sample point in the sweep, that is, a point that is present in the sensed data first accesses that pixel. Conversely, the timing at which a sweep last accesses a pixel means the timing at which a sample point in the sweep, that is, a point that is present in the sensed data last accesses that pixel. The update of the image memory through a scan correlation process needs to be performed only once per antenna rotation, so that if only either one of the FIRST and LAST signals is detected, then the image memory is updated. Moreover, the FIRST and LAST signals are detected based on a signal generated by a calculation process that converts the polar coordinate data into rectangular coordinate data.

The behavior data generator 10 includes a behavior data detector 11 and a behavior data memory 12.

The behavior data detector 11 detects the level of the sensed data that is input from the sweep memory 4 at the timing of the FIRST signal or the LAST signal, that is, at the timing that the sensed image data is extracted. The detected result is binarized, and if the level of the sensed data (sensed image data) is higher than a preset threshold, then level detection data "1" is output, whereas if the level of the sensed data is lower than the preset threshold, then level detection data "0" is output. Here, the threshold is set by the level of sensed data that is to be detected as an object.

The behavior data detector 11 arranges the current detected level detection data and the previous behavior data B(n−1) made of the level detection data of a predetermined number of previous scans that are arranged in a time series and stored in the behavior data memory 12, into a time series to obtain the current behavior data B(n), and outputs the obtained behavior data B(n) to the behavior data memory 12 and the W data generator 7.

The behavior data memory 12 is addressed in correspondence with the image memory 8, and has a capacity of several bits per pixel. This addressing is specified by the write address generator 5. Moreover, the behavior data that is output from the behavior data detector 11 is input into those several bits per pixel. The level detection data of the behavior data is stored while shifting in the time series from LSB to MSB. The result of this shifting process is that the oldest level detection data is discarded. For example, if the number of bits corresponding to each pixel is eight, then the level detection data of eight scans are stored by the behavior data memory 12 as behavior data, in the order of the time series always from the newest level detection data from LSB to MSB. The behavior data stored in this manner is utilized when the behavior data detector 11 creates the next new behavior data.

Figure 2:
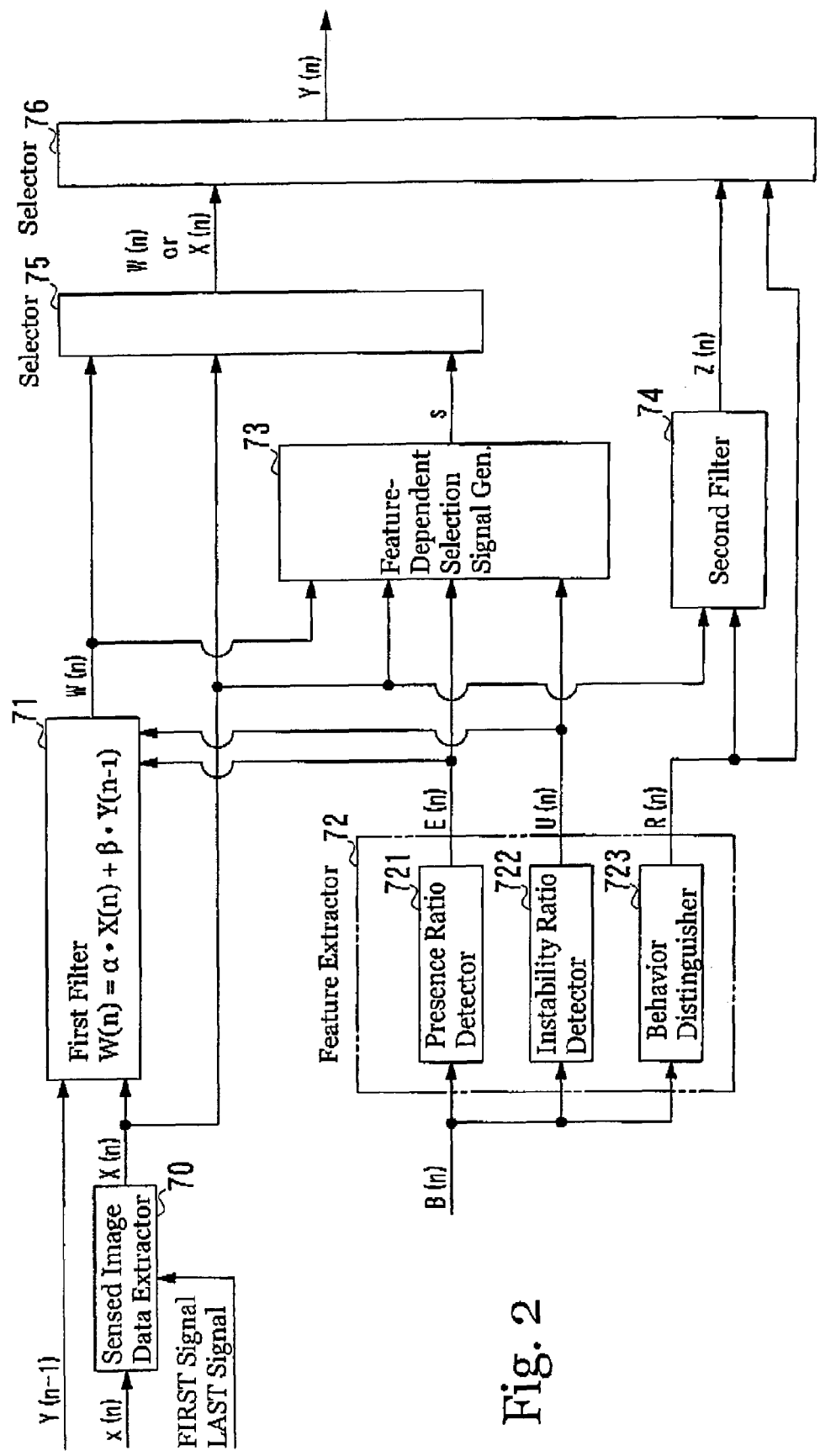
FIG. 2 is a block diagram outlining the configuration of the W data generator 7 shown in FIG. 1.
Figure 8:
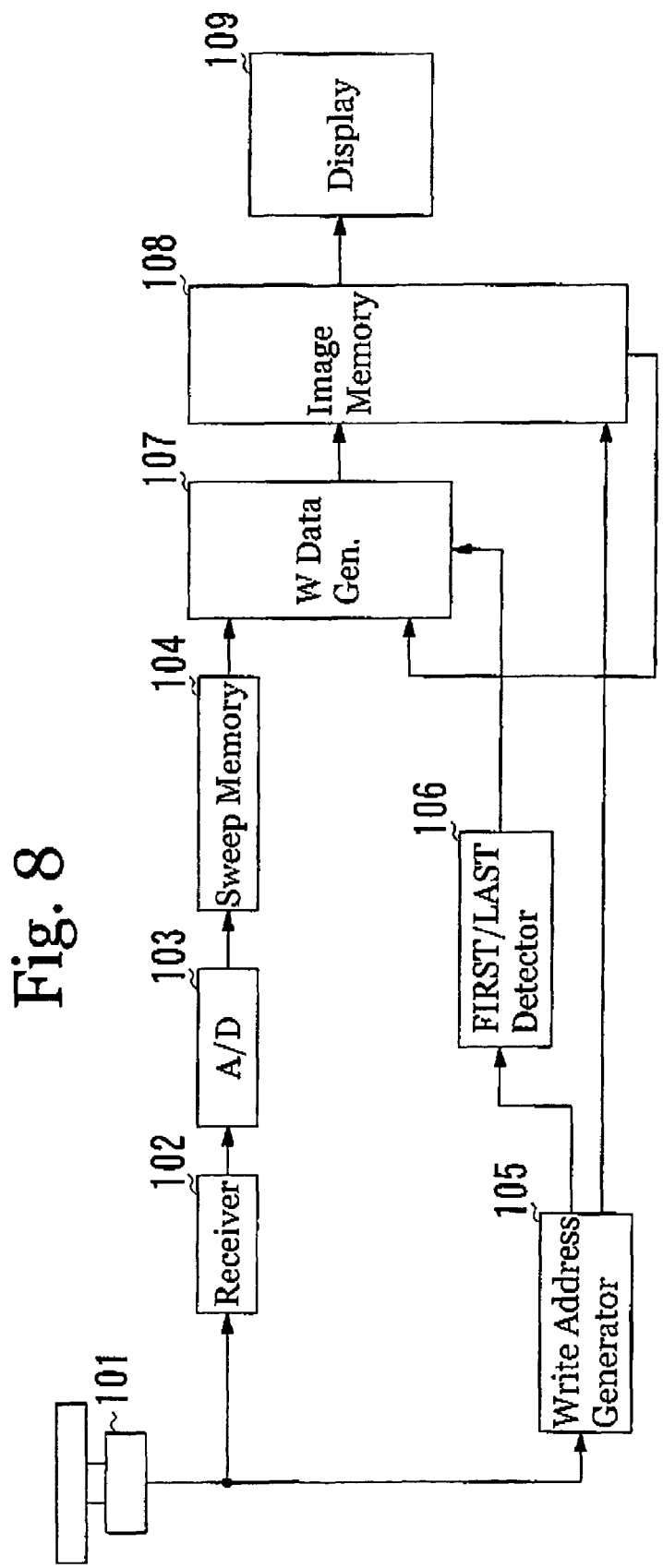
FIG. 8 is a block diagram outlining the configuration of a conventional radar device.
Figure 9:
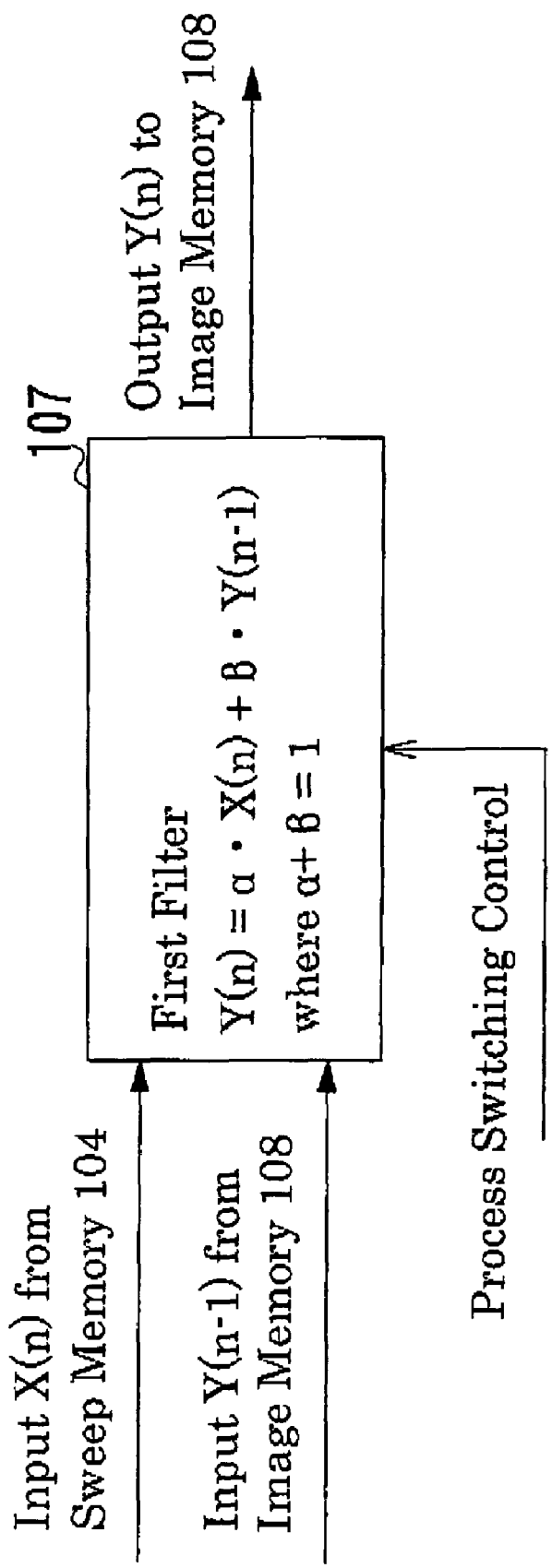
FIG. 9 is a block diagram illustrating the function of the write data generator of the radar device shown in FIG. 8.

The W data generator (write data generator) 7 has the configuration shown in FIG. 2, and outputs, as the current written sensed image data Y(n), either filter calculation data W(n), sensed image data X(n) or specific calculation data Z(n) obtained by a specific filter process. The filter calculation data W(n) is obtained by a filtering process of sensed image data X(n) and the previous written sensed image data Y(n−1). The sensed image data X(n) is obtained with a later-described sense image data extractor 70 from the current sensed data x(n) that is input from the sweep memory 4. The previous written sensed image data Y(n−1) is input from the later-described image memory 8. During its operation, the W data generator 7 outputs W(n), X(n) or Z(n) as the current written sensed image data Y(n), depending on the characteristics of the sensed image data of that pixel, in accordance with the behavior data B(n) that is output from the behavior data generator 10. This W data generator 7 corresponds to a "sensed image data generation means" in accordance with the present invention.

The image memory 8 has sufficient capacity to store the sensed image data for one antenna rotation, that is, for one sweep rotation. The current written sensed image data Y(n) that is generated by the above-noted W data generator 7 is written into the pixels whose address is specified by the write address generator 5. Then, when the display performs a raster scan operation under the control of a display control portion (not shown in the drawings), the sensed image data that is stored in the image memory 8 is read out at high speed in synchronization with this raster scan operation, and a sensed image is displayed on the display 9 at a brightness and color corresponding to this data.

The following is a more detailed description of the configuration of the W data generator 7.

FIG. 2 is a block diagram showing an overview of the configuration of the W data generator 7 shown in FIG. 1.

The W data generator 7 includes a sensed image data extractor 70, a first filter 71, a feature extractor 72, a feature-dependent selection signal generator 73, a second filter 74, and selectors 75 and 76.

Based on the FIRST or LAST signal that is input from the FIRST/LAST detector 6, the sensed image data extractor 70 extracts from the sensed data x(n) that is input from the sweep memory the sensed image data X(n) corresponding to the pixels in the image memory 8 of the rectangular coordinate system, and outputs the sensed image data X(n) to the first filter 71.

The first filter 71 determines the current filter calculation data W(n) using the current sensed image data X(n) of the corresponding pixel that is input from the sensed image data generator 70 and the previous written sensed image data Y(n−1) of the corresponding pixel that is input from the image memory 8.

The current filter calculation data W(n) is output using an IIR filter that can be expressed by the following equation, for example:

$$W(n)=\alpha \cdot X(n)+\beta \cdot Y(n-1) \text{ (where } \alpha<\beta, \alpha+\beta=1) \quad (2)$$

Here, $\alpha$ and $\beta$ are coefficients that have been determined in advance, or variables that vary in accordance with the presence ratio or the instability ratio. In the present embodiment, these values are used to set the values for improving the recognition performance of sea clutter and of small objects within sea clutter.

The current filter calculation data W(n) that is output from the first filter 71 is input into the feature-dependent selection signal generator 73 and the selector 75.

The feature extractor 72 includes a presence ratio detector 721, an instability ratio detector 722, and a behavior distinguisher 723.

The presence ratio detector 721 is made of a counter circuit or the like, and counts the number of "1"s in the level detection data included in the behavior data B(n) at the timing of the FIRST signal or LAST signal at which the behavior data is updated. In other words, the presence ratio detector 721 calculates a presence ratio E(n) indicating the proportion of "1"s in the level detection data, which indicates that an object has been detected, from the behavior data B(n) of the corresponding pixels, which is constituted by the level detection data of a plurality of scans including the current one. For example, if there are four "1"s among the above-noted eight bits (i.e. four of the eight bits are "1"), then the presence ratio E(n) is "4".

The instability ratio detector 722 calculates the number of level changes from "1" to "0" or from "0" to "1" in the behavior data B(n) at the timing of the FIRST signal or LAST signal at which the behavior data is updated. In other words, the instability ratio detector 722 calculates an instability ratio U(n) indicating the total proportion of level transitions from "1", which indicates that an object has been detected, to "0", which indicates that no object has been detected, or from "0" to "1". The instability ratio detector 722 calculates the instability ratio U(n) from the behavior data B(n) of the corresponding pixels, which is constituted by the level detection data of a plurality of scans including the current one. For example, if there are seven level transitions within the eight bits, then the instability ratio U(n) is seven.

The behavior data B(n) is also given into the behavior distinguisher 723, and if the data pattern of the behavior data B(n) corresponds to any of the various classification patterns shown in FIG. 3, then a classification code R(n)=1 . . . 4 corresponding to that classification pattern is output to the second filter 74 and the selector 76, whereas otherwise, a classification code R(n)=0 is output to the second filter 74 and the selector 76.

FIG. 3 is a diagram showing the classification patterns of the behavior data, with (A) to (E) respectively showing classification code 1 to classification code 4 and classification code 0. Here, classification code 1 represents the case that, after a state in which no object echo (referred to simply as "echo" below) is detected, an echo is detected for the first time. classification code 2 represents the case that, after a state in which no echo is detected, an echo is detected for two successive scans. Classification code 3 represents the case that, after a state in which no echo is detected, an echo is detected for three successive scans. Classification code 4 represents the case that, after a state in which no echo is detected, an echo is detected for one scan, but then no echo is detected, as well as the case that no echo is detected for at least six successive scans, including the current one. Moreover, classification code 0 applies to the case of an echo pattern that is different to the patterns of the above classification codes 1 to 4.

The feature-dependent selection signal generator 73 outputs a selector selection signal s indicating the desired sensed image data, based on the filter calculation data W(n) that is input from the first filter 71, the current sensed image data X(n), the presence ratio E(n) that is input from the presence ratio detector 721, and the instability ratio U(n) that is input from the instability detector 722. That is to say, a selector signal s is output that causes the current sensed image data X(n) to be output from the selector 75 if the conditions X(n)>W(n), E(n)>4 and U(n)<3 are concurrently satisfied, and that causes the filter calculation data W(n) to be output otherwise. For example, if a comparatively constant and stable detection is made at the same point, as for a fixed object, where the presence ratio is high and the instability ratio is low, then the current sensed image data X(n) is selected, whereas if there is no constant detection and the instability ratio is high, as for sea clutter, then the filter calculation data W(n) is selected.

Using the above-noted classification code R(n) that is input from the behavior distinguisher 723 and the current sensed image data X(n), the second filter 74 produces specific filter calculation data Z(n) in accordance with preset rules, and outputs the specific filter calculation data Z(n) to the selector 76. More specifically, the second filter 74 compares a specific value set in advance in accordance with the calculation codes with the current sensed image data X(n) that has been input, and outputs the smaller of the two as the specific filter calculation data Z(n).

For example, Table 1 shows the correlation between the classification codes and the specific filter calculation data Z(n), which is set to eight bits (where the upper four bits are the integer part and the lower four bits are the decimal fraction part). It should be noted that when the upper four bits of the eight bits are taken as the integer part and the lower four bits are taken as the decimal fraction part, then it is possible to attain a computation precision of $\frac{1}{16}$ with the four bits of the decimal fraction part. That is to say, since the constants α and β of the calculation equation (Equation (2)) for the filter calculation data W(n) are smaller than 1, the written sensed image data Y(n) includes decimal fractions.

TABLE 1

| Classification code | Generated data Zn (n) | |
| --- | --- | --- |
|  | decimal | bits (binary) |
| 1 | 1 | 00010000 |
| 2 | 8 | 10000000 |
| 3 | 15 | 11110000 |
| 4 | 0 | 00000000 |
| 0 | — | — |

As shown in Table 1, in the case of classification code 1, the specific filter calculation data Z(n) is set to the value "1", so that the value "1" is output as is as the specific filter calculation data Z(n). In the case of classification code 2, the specific filter calculation data Z(n) is set to the value "8", so that if the current sensed image data X(n) is "8" or greater, then "8" is output, whereas if the current sensed image data X(n) is smaller than "8", then the value of the current sensed image data X(n) is output as the specific filter calculation data Z(n). In the case of classification code 3, the specific filter calculation data Z(n) is set to the value "15", so that if the current sensed image data X(n) is "15", then "15" is output, whereas if the current sensed image data X(n) is smaller than "15", then the value of the current sensed image data X(n) is output as the specific filter calculation data Z(n). In the case of classification code 4, the value of the specific filter calculation data Z(n) is set to "0", so that the value "0" is output as is as the specific filter calculation data Z(n). In the case of classification code 0, the selector 76 does not select the specific filter calculation data Z(n) that is output by the second filter 74, as explained below, so that the data Z(n) becomes invalid.

Into the selector 75, the filter calculation data W(n) from the first filter 71 is input together with the current sensed image data X(n) from the sensed image data extractor 70. Also input into the selector 75 is the select signal s from the feature-dependant selection signal generator 73. Based on the select signal s, the selector 75 outputs either the filter calculation data W(n) or the current sensed image data X(n) to the selector 76.

The output data from the selector 75 and the specific filter calculation data Z(n) from the second filter 74 are input into the selector 76. Also input into the selector 76 is the classification code R(n) from the behavior distinguisher 723 of the feature extractor 72. Based on the classification code R(n), the selector 76 outputs either the output data from the selector 75 (i.e. the filter calculation data W(n) or the current sensed image data X(n)) or the specific filter calculation data Z(n). More specifically, in the configuration of the present embodiment, if the classification code is 1 to 4, it outputs the specific filter calculation data Z(n), and if the classification code is 0, it outputs the output data from the selector 75 as the current written sensed image data Y(n) to the image memory 8.

Referring now to FIGS. 4 and 5, the following is a description of the processing performed by the radar device of the present embodiment. FIG. 4 is a diagram outlining the change of the content of each bit of the behavior data memory in the different states (A) to (M). The following illustrates the case that processing is performed using behavior data with eight bits.

(1) Receiving the Echo of a Moving Ship

FIG. 4(A) to (J) shows, for one particular pixel that is observed, the temporal transition of states from the time before a ship appears up to the state six scans after the ship has passed, in the order of (A) to (J). It is assumed that the current sensed image data X(n) corresponding to the current echo is X(n)=15. Also, the conditions at which the feature-dependent selection signal generator 73 generates a select signal s with which the current sensed image data X(n) is output are set to:

$$X(n) > W(n), E(n) > 4, U(n) < 3 \quad \text{(St1)}$$

Furthermore, the coefficients α and β of the equation for calculating the filter calculation data W(n) with the first filter 71 are set to "0.1" and 0.9", respectively. That is:

$$W(n) = 0.1 \cdot X(n) + 0.9 \cdot Y(n-1) \quad (2)$$

FIG. 4(A) shows the state before the ship appears, and all bits of the behavior data B(0) are "0". In this case, the classification code R(0) that is output from the behavior distinguisher 723 becomes "4" in accordance with the specifications noted above, so that the specific filter calculation data Z(0)=0 is output from the second filter 74. At the same time, the classification code R(0)=4 is input into the selector 76, so that the selector 76 outputs the specific filter calculation data Z(0)=0. Thus, the written sensed image data Y(0) becomes "0".

Next, in FIG. 4(B), the ship begins to appear, that is, this is the state in which an echo of the ship is first received, and only the bit (0) representing the newest state of the behavior data B(1) is "1". In this case, the classification code R(1) output from the behavior distinguisher 723 becomes "1" in accordance with the above-noted specifications, so that the specific filter calculation data Z(1)=1 is output from the second filter 74. At the same time, the classification code R(1)=1 is input into the selector 76, so that the selector 76 outputs the specific filter calculation data Z(1)=1. Thus, the written sensed image data Y(1) becomes "1".

Next, FIG. 4(C) shows the state after two scans have passed after the ship's echo is picked up (while the ship is passing), and only the bit (0) and the bit (1), which are the newest two bits of the behavior data B(2), are "1". In this case, the classification code R(2) output from the behavior distinguisher 723 becomes "2" in accordance with the above-noted specifications, so that the specific filter calculation data Z(2)=8 is output from the second filter 74. At the same time, the classification code R(2)=2 is input into the selector 76, so that the selector 76 outputs the specific filter calculation data Z(2)=8. Thus, the written sensed image data Y(2) becomes "8".

Next, FIG. 4(D) shows the state after three scans have passed after the ship's echo is picked up (while the ship is passing), and only the bit (0), the bit (1) and the bit (2), which are the newest three bits of the behavior data B(3), are "1". In this case, the classification code R(3) output from the behavior distinguisher 723 becomes "3" in accordance with the above-noted specifications, so that the specific filter calculation data Z(3)=15 is output from the second filter 74. At the same time, the classification code R(3)=3 is input into the selector 76, so that the selector 76 outputs the specific filter calculation data Z(3)=15. Thus, the written sensed image data Y(3) becomes "15".

Next, FIG. 4(E) shows the state when the passage of the ship has finished, that is, an echo of the ship is not picked up for the first time after passage of the ship, and the bit (0) representing the newest state of the behavior data B(4) is "0", whereas the three bits (1), (2) and (3) representing the immediate past therefrom are "1". In this case, the classification code R(4) output from the behavior distinguisher 723 becomes "0" in accordance with the above-noted specifications, so that the specific filter calculation data Z(4) that is output from the second filter 74 is not selected by the selector 76.

Here, the current sensed image data X(4) is "0", the presence ratio E(4) that is output from the presence ratio detector 721 is "3", and the instability ratio U(4) that is input from the instability ratio detector 722 is "2". Also, since the previous written sensed image data Y(3) is "15", the current filter calculation data W(4) according to Equation (2) becomes "13.5". Therefore, the feature-dependent selection signal generator 73 lets the selector 75 output the filter calculation data W(4)=13.5, in accordance with the above-noted selection condition St1. Since the classification code R(4)=0 is input into the selector 76, the selector 76 outputs the output from the selector 75, that is, the filter calculation data W(4)=13.5. Thus, the written sensed image data Y(4) becomes "13.5".

Next, FIG. 4(F) shows the state when two scans have passed after the passage of the ship has finished, and the newest two bits (0) and (1) of the behavior data B(s) are "0", whereas the three bits (2), (3) and (4) representing the immediate past therefrom are "1". In this case, the classification code R(5) output from the behavior distinguisher 723 becomes "0" in accordance with the above-noted specifications, so that the specific filter calculation data Z(5) that is output from the second filter 74 is not selected by the selector 76.

Here, the current sensed image data X(5) is "0", the presence ratio E(5) that is output from the presence ratio detector 721 is "3", and the instability ratio U(5) that is input from the instability ratio detector 722 is "2". Also, since the previous written sensed image data Y(4) is "13.5", the current filter calculation data W(5) according to Equation (2) becomes "12.2". Therefore, the feature-dependent selection signal generator 73 lets the selector 75 output the filter calculation data W(5)=12.2, in accordance with the above-noted selection condition St1. Since the classification code R(5)=0 is input into the selector 76, the selector 76 outputs the output from the selector 75, that is, the filter calculation data W(5)=12.2. Thus, the written sensed image data Y(5) becomes "12.2".

Next, also in FIGS. 4(G) to 4(I), X(n) and E(n) are X(n)=0 and E(n)=3, so that in accordance with selection condition St1, the filter calculation data W(n) is selected by the selector 75. Furthermore, since the classification code R(n)=0, the selector 76 selects the filter calculation data W(n), and the written sensed image data Y(n) becomes the filter calculation data W(n). As a result, from the state shown in FIG. 4(G) to the state shown in FIG. 4(I), the written sensed image data Y(n) changes as follows:

State of FIG. 4(G): Y(6)=W(6)=11.0
State of FIG. 4(H): Y(7)=W(7)=9.9
State of FIG. 4(I): Y(8)=W(8)=8.9

Next, FIG. 4(J) shows the state when six scans have passed after the passage of the ship has finished, and the newest six bits (0) to (5) of the behavior data B(9) are "0", whereas the two bits (6) and (7) representing the immediate past therefrom are "1". In this case, the classification code R(9) output from the behavior distinguisher 723 becomes "4" in accordance with the above-noted specifications, so that the specific filter calculation data Z(9)=0 is output from the second filter 74. At this time, the classification code R(9)=4 is input into the selector 76, so that the selector 76 outputs the specific filter calculation data Z(9)=0. Thus, the written sensed image data Y(9) is forcibly set to "0".

Table 2 and FIG. 5 show the transition of the values of the sensed image data X(n), the classification code R(n) from the behavior distinguisher 723, the specific filter calculation data Z(n), the filter calculation data W(n) and the written sensed image data Y(n) for the states (A) to (J) of a moving ship as described above. Table 2 and FIG. 5 show the values for the case assuming that the first filter calculation data W(n) is used for all states. In FIG. 5, the solid line represents the transition of the written sensed image data Y (displayed image data) after envelope processing, for the case that the configuration of the present embodiment is used. The broken line represents the transition of the written sensed image data Y after envelope processing, for the case that only the first filter calculation process is used.

TABLE 2

| State | n | X(n) | R(n) | Z(n) | W(n) | Y(n) | W(n) alone |
|---|---|---|---|---|---|---|---|
| A | 0 | 0 | 4 | 0 | 0 | 0 (Z(n)) | 0 |
| B | 1 | 15 | 1 | 1 | 1.5 = 0.1 × 15 + 0.9 × 0 | 1.5 (Z(n)) | 1.5 |
| C | 2 | 15 | 2 | 8 | 2.4 = 0.1 × 15 + 0.9 × 1.0 | 8.0 (Z(n)) | 2.9 |
| D | 3 | 15 | 3 | 15 | 8.7 = 0.1 × 15 + 0.9 × 8.0 | 15.0 (Z(n)) | 4.1 |
| E | 4 | 0 | 0 | — | 13.5 = 0.1 × 0 + 0.9 × 15 | 13.5 (11R) | 3.7 |
| F | 5 | 0 | 0 | — | 12.2 = 0.1 × 0 + 0.9 × 13.5 | 12.2 (11R) | 3.3 |
| G | 6 | 0 | 0 | — | 11.0 = 0.1 × 0 + 0.9 × 12.2 | 11.0 (11R) | 3.0 |
| H | 7 | 0 | 0 | — | 9.9 = 0.1 × 0 + 0.9 × 11.0 | 9.9 (11R) | 2.7 |
| I | 8 | 0 | 0 | — | 8.9 = 0.1 × 0 + 0.9 × 9.9 | 8.9 (11R) | 2.4 |
| J | 9 | 0 | 4 | 0 | 8.0 = 0.1 × 0 + 0.9 × 8.9 | 0 (Z(n)) | 2.2 |

As shown in Table 2 and FIG. 5, using the configuration of the present embodiment, the maximum value of the written image data representing the ship becomes large, and after the ship has passed, the written sensed image data quickly reverts to "0". On the other hand, if only the first filter calculation process is used, then the maximum value of the written image data representing the ship becomes small, and it takes longer until the written sensed image data reverts to "0" after the ship has passed. Therefore, with the method of using only the first filter calculation process, the display image of the ship is inhibited, and a longlasting afterglow stays. Moreover, the relation between the solid line and the broken line in FIG. 5 shows that in the case of a simple filter process, other moving ships may be inhibited with settings that suppress sea clutter in the filter process. On the other hand, in the case of the present embodiment, other moving ships and sea clutter are recognized separately based on the behavior data indicating the past behavior, so that by carrying out different filter processes for each, the inhibition of ships is made smaller than the inhibition of sea clutter, and recognized ships are easily displayed. Consequently, by using the configuration of the present embodiment, when looking at the displayed screen, sensed and recognized ships can be displayed more clearly, and the time of the afterglow after a ship has passed can be made shorter. Thus, the intended objects are recognized more easily, and a radar image can be attained that is easier to view.

(2) The Case of an Echo that Exists Only in One Scan and Vanishes Again, after a State without an Echo FIG. 4(K) shows a state where an echo exists only for one scan and then vanishes again, after a state without an echo. This state occurs after the state of FIG. 4(A) or the state of FIG. 4(B). The states of FIGS. 4(A) and 4(B) have already been explained above, so that their further explanation is omitted.

In the state of FIG. 4(K), only the bit (1), which is the second newest, of the behavior data B is "1". In this case, the classification code R that is output from the behavior distinguisher 723 becomes "4" in accordance with the above-described specifications, so that the specific filter calculation data Z=0 is output from the second filter 74. At this time, the classification code R=4 is input into the selector 76, so that the selector 76 outputs the specific filter calculation data Z=0. Thus, the written sensed image data Y becomes "0".

With such a configuration, the written sensed image data Y makes the transition "0"→"1"→"0". That is to say, in the case of a non-continuous instable echo that is only seen momentarily, such that after there is no echo, there is an echo during only one scan, and then the echo vanishes again, the display is suppressed to a very low level, and exterminated immediately, so that no afterglow remains.

Thus, sea clutter or noise or the like in which there are non-continuous echoes at the same pixel positions, are suppressed, and the required movement of ships can be recognized clearly.

(3) Land and Stable Echoes

In this state the case is indicated, by increasing the gain, that the echo of large fixed objects with strong reflections is continuously present at the same pixels.

FIG. 4(L) shows the state where there is an echo for at least eight continuous scans. This state corresponds to the state where after the above-described states of FIGS. 4(A) to 4(D), more bits indicating an echo are added. The states of FIGS. 4(A) to 4(D) have been explained already, so that their further explanation is emitted and since the states from FIG. 4(D) to FIG. 4(L) can be easily surmised from the above explanations, their further explanation is emitted as well.

In the state of FIG. 4(L), the behavior data B is "1" for all bits (0) to (7). In this case, the classification code R that is output from the behavior distinguisher 723 becomes "0" in accordance with the above-noted specification, so that the specific filter calculation data Z that is output from the second filter 74 is not selected by the selector 76.

Here, the current sensed image data X is "15", the presence ratio E that is output from the presence ratio detector 721 is "8", and the instability ratio U that is input from the instability ratio detector 722 is "0". Therefore, the feature-dependent selection signal generator 73 compares the filter calculation data W and the current sensed image data X in accordance with the above-noted selection conditions St1, and outputs whichever is larger to the selector 75. The classification code R=0 is input into the selector 76, so that the selector 76 outputs the output from the selector 75, that is, the larger one of the filter calculation data W and the current sensed image data X. Thus, the written sensed image data Y becomes the larger one of the filter calculation data W and the current sensed image data X. With a configuration in which the larger one is selected in this manner, stable and easy-to-recognize display image data can be attained by employing the first filter calculation data, even when the sensed image data momentarily disappears.

As noted above, with this configuration, sufficiently large written sensed image data can be attained when the input of an echo continues for three scans, so that three scans are sufficient in order to raise the gain and pick up an echo of an object. Thus, it is possible to quickly display the gain adjustment result, and to improve the operability.

(4) Case where the Gain is Lowered and the Echo Vanishes after a State with Raised Gain FIG. 4(M) shows the state where the echo starts to vanish after a state in which a continuous echo is picked up as shown in FIG. 4(L). Now, the state shown in FIG. 4(L) has been explained above, so that its further explanations have been omitted.

In the state of FIG. 4(M), only the bit (0), indicating the newest state, of the behavior data B is "0", whereas the other bits (1) to (7) are "1". In this case, the classification code R output by the behavior distinguisher 723 becomes "0" in accordance with the above-noted specifications, so that the specific filter calculation data Z output from the second filter 74 is not selected by the selector 76.

Here, the current sensed image data X is "0", the presence ratio E that is output by the presence ratio detector 721 is "7", and the instability ratio U that is input from the instability ratio detector 722 is "1". Therefore, the feature-dependent selection signal generator 73 lets the selector 75 output the filter calculation data W, in accordance with the above-noted selection conditions St1. Since the classification code R=0 is input into the selector 76, the selector 76 outputs the output from the selector 75, that is, the filter calculation data W. Then, if there is no more echo after that, then the filter calculation data W that is output will decrease every time, and if there is no echo for at least six continuous scans (state shown in FIG. 4(J)), then the written sensed image data becomes "0" as described above.

Thus, if an operation lowering the gain is performed, the time of an unnecessary afterglow can be shortened by switching from the first filter calculation data W to the specific filter calculation data Z.

(5) Case of Instable Echoes, Such as Sea Clutter or Small Objects within Sea Clutter If the process of eliminating sea clutter using gain or STC is properly adjusted, then the probability that there is an echo of sea clutter at the same pixel position in each scan becomes very small. Consequently, the probability that an "0" or a "1" occurs regularly as the behavior data is smaller than in the case of a moving ship or a stable object. Thus, the classification code that is output from the behavior distinguisher 723 becomes "0", which is different from the classification codes 1 to 4 indicating a regular behavior, and depending on the selection conditions St1, either the first filter calculation data W(n) or the current sensed image data X(n) become the written sensed image data Y(n). In the case of sea clutter, in which the instability ratio U(n) is large, the first filter calculation data W(n) becomes the written sensed image data Y(n), in accordance with the selection condition St1, and is suppressed for the display. Also in the case of objects with large instability, the first filter calculation data W(n) becomes the written sensed image data Y(n), as in the case of sea clutter, but if there is a difference in the input frequency and the level of the sensed image data X(n), then this difference will appear in the first filter calculation data W(n). As a result, in the case of an object having a larger input frequency and input level of the sensed signal than sea clutter, the first filter calculation data W(n) of the object becomes larger than that of sea clutter, and the object becomes an image that is easily recognized.

Furthermore, if the coefficients α and β determining the filter characteristics of the first filter are set to α=0.1 and β=0.9, then the filter effect is stronger and more suppressed first filter calculation data W(n) can be attained than with α=0.2 and β=0.8. Consequently, by changing the coefficients α and β in correlation with the presence ratio and the instability ratio, it is possible to reflect differences in the presence ratio and the instability ratio in the first filter calculation data W(n).

In the foregoing explanations, the coefficients (constants) α and β of the filter calculation process were set such that the relation α+β=1 is satisfied, but depending on the image to be obtained, they may also be set such that α+β>1 or α+β<1. Thus, it is possible to better enhance the image data of necessary echoes, or to suppress the image data of unnecessary echoes. For example, when the presence ratio E(n) is large, by performing the calculation with α+β>1, it is possible to enhance the display and attain an image (image data) that is easy to recognize, even with echoes that are difficult to recognize because they are from far objects and have a low reflection intensity.

With the above configuration, it is possible to attain a display image as shown in FIG. 6.

FIG. 6 shows diagrams outlining display images. FIG. 6(A) shows the case where no scan correlation process is performed, FIG. 6(B) shows the case that a conventional scan correlation process is performed that consists only of a single filter process, and FIG. 6(C) shows the case that a scan correlation process is performed that is realized by the configuration of the present embodiment.

As shown in FIG. 6(A), if no scan correlation process is performed, than images of the three fixed sea buoys, the moving ship and the sea clutter are all displayed in the same manner, so that it is difficult to distinguish ships and buoys from the sea clutter. As shown in FIG. 6(B), if a scan correlation process consisting only of a single filter process is carried out, then the sea clutter is suppressed and the fixed buoys are displayed more clearly, but also the image of the moving ship is suppressed. On the other hand, as shown in FIG. 6(C), if the scan correlation process of the present embodiment is carried out, then both the images of the fixed buoys and the moving ship can be displayed clearly, and the sea clutter can be suppressed.

Thus, a radar device can be realized, that clearly distinguishes buoys and moving ships from sea clutter. That is to say, the echo type is detected from the echo behavior, and by performing a scan correlation process in accordance with the echo type, it is possible to realize a radar device, with which necessary echoes can be displayed enhanced, while unnecessary echoes can be suppressed.

Furthermore, by using the above configuration, the time until a stable object becomes a stable display can be reduced, and also the time of afterglow after the echo of an object has vanished can be reduced, so that the visibility of displayed images can be improved, and a radar device with superior operability can be realized.

In the foregoing description, the written sensed image data is selected in accordance with the selection conditions St1, but the conditions of the presence ratio E(n) and the instability ratio U(n) can be made as suitable in accordance with the desired state.

FIG. 7(A) is a diagram showing the relation between the presence ratio E(n), the instability ratio U(n) and the various echo regions, where all echoes are present within the substantially triangular region shown in FIG. 7(A). This is due to the following reason. In the case of a stable echo, such as land, the presence ratio E(n) is 100%, and the instability ratio U(n) is 0%, and if there is no echo, then the presence ratio E(n) is 0% and the instability ratio U(n) is 0%. In the case of an echo that changes all the time, the instability ratio U(n) is 100% and the presence ratio E(n) is 50%. If the presence ratio E(n) is 50%, then the instability ratio U(n) cannot be 0%. For this reason, all echoes are within the substantially triangular region shown in FIG. 7(A).

FIG. 7(B) is a diagram showing the relation between the presence ratio E(n) and the instability ratio U(n) on the one hand, and the selection regions of the filter calculation data W(n), the sensed image data X(n) and the specific filter calculation data Z(n) on the other hand.

As shown in FIGS. 7(A) and 7(B), the region of the echoes of moving ships, the region of land or stable echoes, and the region of sea clutter or instable echoes can each be identified through the relation between the presence ratio E(n) and the instability ratio U(n), and each of these regions can be associated with a region employing the specific filter calculation data Z(n) or the filter calculation data W(n), a region employing only the filter calculation data W(n), and a region employing the larger one of the sensed image data X(n) and the filter calculation data W(n).

The conditions of the desired presence ratio E(n) and instability ratio U(n) should be set in accordance with this relational diagram.

Moreover, the foregoing explanations were for a radar device, but the above-explained configuration can also be adopted in other devices displaying sensed images, such as scanning sonar devices, and the same effect as described above can be attained.

Furthermore, in the foregoing explanations, the scan correlation process was performed in the rectangular coordinate system, but it is also possible to perform the scan correlation process while still in the polar coordinate system.

Furthermore, in the foregoing explanations, an IIR filter, which has a simple structure and can be obtained comparatively easily, was used as the first filter, but it is also possible to use another filter, such as a FIR filter.

What is claimed is:

1. A radar comprising:
    a sensed image data generation means for extracting sensed image data corresponding to pixels of an image memory from received sensed data, and generating current written sensed image data to be written into the image memory, based on the extracted sensed image data and previously written sensed image data stored in the image memory;
    an image memory storing written sensed image data for one scan;
    a display device showing display image data based on the current written sensed image data; and
    a behavior data generation means comprising:
        a behavior data detection means for detecting a level change behavior for each scan of the extracted sensed image data; and
        a behavior data storage means for storing behavior data for each pixel for a predetermined number of scans;
        the behavior data generation means outputting the behavior data, while updating the behavior data, to the sensed image data generation means;
    wherein the sensed image data generation means recognizes characteristics of the sensed image data of the corresponding pixels from behavior data of a time series input from the behavior data generation means, and generates the written sensed image data that is written into each pixel through a filtering process and a selection process in accordance with the result of this recognition; and wherein the sensed image data generation means detects, from the behavior data, a presence ratio of the sensed image data and an instability ratio given by the number of times that the sensed image data changes within a predetermined period, and performs the filtering process and the selection process based on the presence ratio and the instability ratio.

2. The radar according to claim 1, wherein the sensed image data generation means varies a coefficient of the filtering process based on the presence ratio and the instability ratio.

3. The radar as in claim 1 or 2, wherein, if the behavior data turns into any one of a predetermined number of specific patterns that have been set in advance, the sensed image data generation means performs a specific filtering process in accordance with the specific pattern.

* * * * *